April 12, 1938.  R. D. GEORGE  2,113,803
TRAILER TANK CONSTRUCTION
Filed Jan. 10, 1936  3 Sheets-Sheet 1
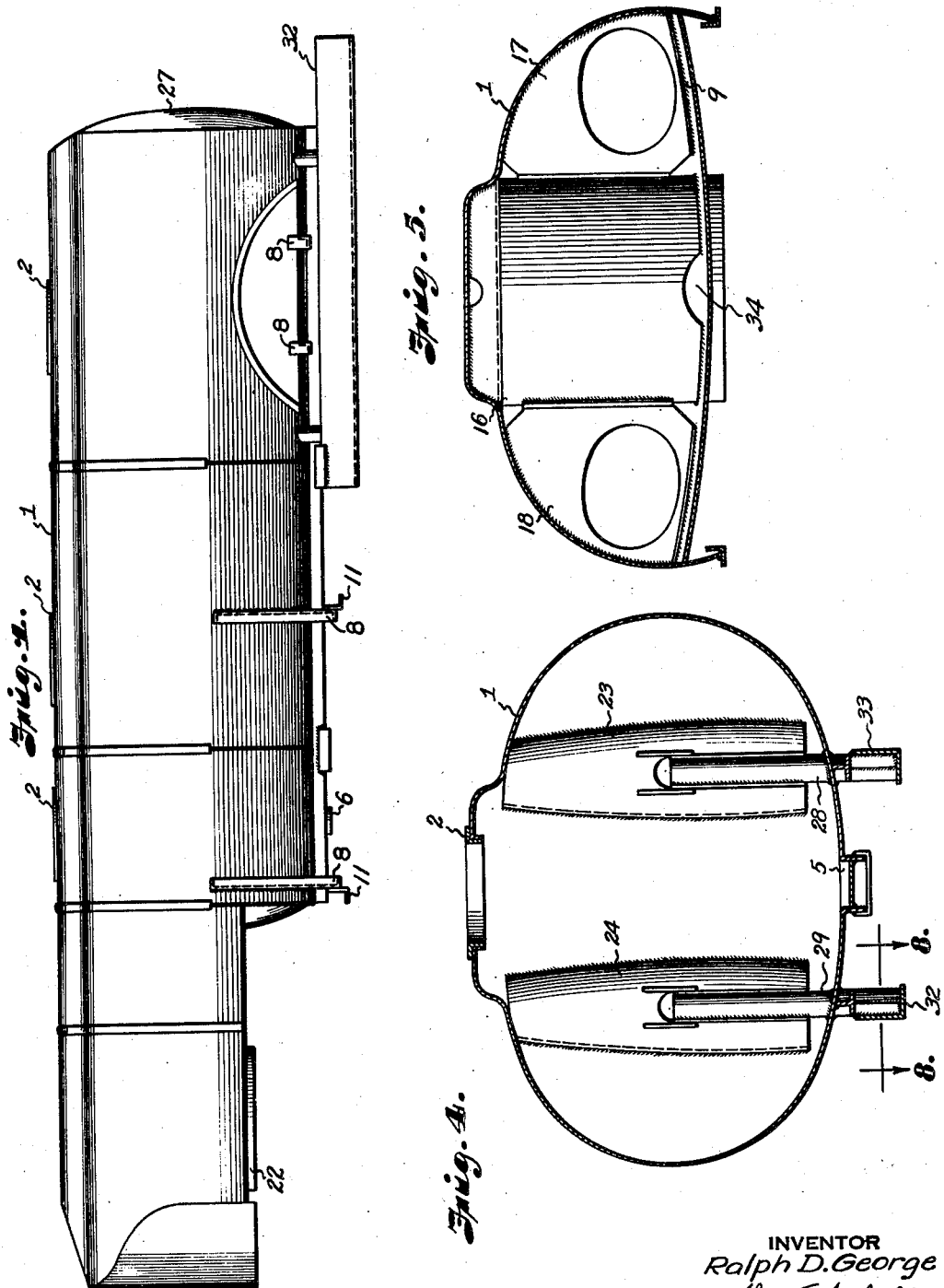
INVENTOR
Ralph D. George
BY
ATTORNEY April 12, 1938.  R. D. GEORGE  2,113,803
TRAILER TANK CONSTRUCTION
Filed Jan. 10, 1936  3 Sheets-Sheet 2
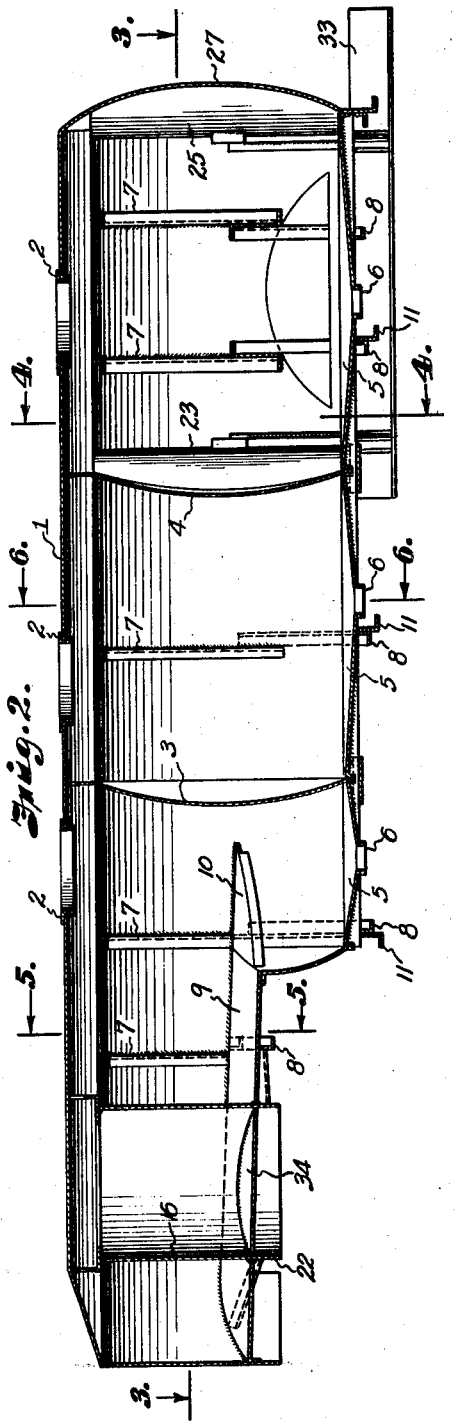
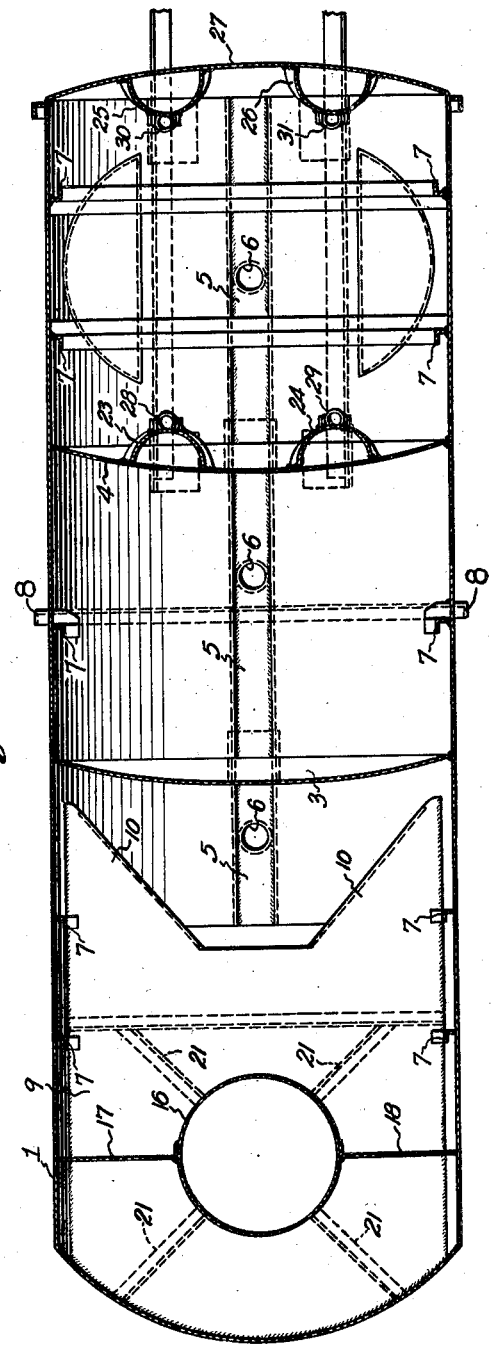
INVENTOR
Ralph D. George
BY
ATTORNEY

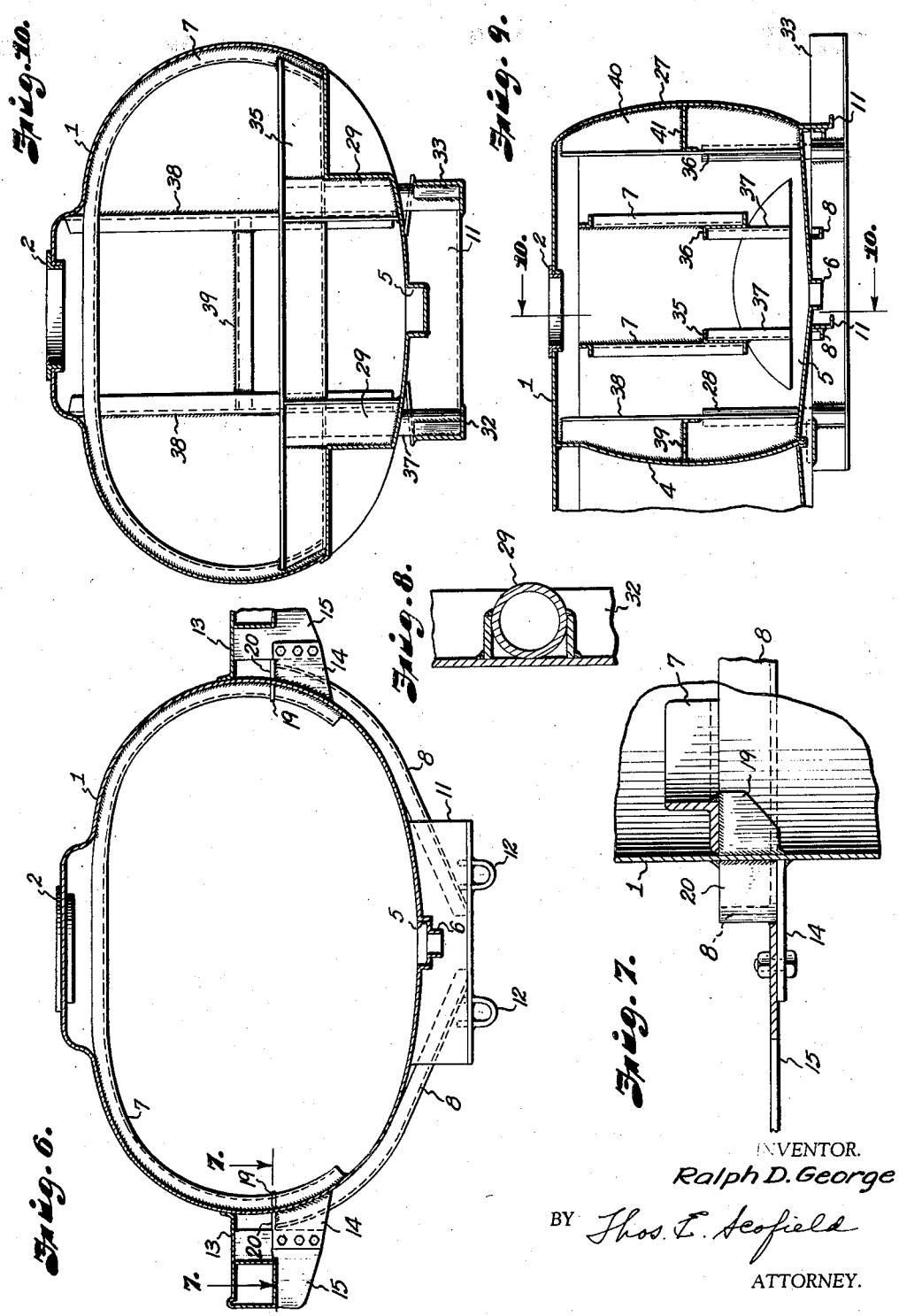

Patented Apr. 12, 1938

2,113,803

UNITED STATES PATENT OFFICE 2,113,803

TRAILER TANK CONSTRUCTION

Ralph D. George, Kansas City, Mo., assignor to Butler Manufacturing Company, Kansas City, Mo., a corporation of Missouri Application January 10, 1936, Serial No. 58,527

8 Claims. (Cl. 280—5)

My invention relates to trailer tank constructions and more particularly to an improved construction whereby the customary trailer frame may be dispensed with.

Of late, the increase in the number of automobiles has made the distribution and transportation of motor fuels a problem of prime importance. Railroads and pipe lines must necessarily travel between principal cities. There is a vast area in which there exists a demand for gasoline and fuel oils, to which these commodities must be transported by independent vehicles. The increase in the number of tank wagons and tank trailers has caused most States to pass laws limiting their size and weight. It has become a factor of prime importance as a matter of economical transportation to obtain as large a pay load as possible for a given dead weight of transporting vehicle. The trailer lends itself to the hauling of greater loads for a given motive unit. It has been customary to support trailer tanks upon a trailer frame or chassis, the function of which is to carry the load. This represents a distinct loss in pay load since the weight of the trailer frame and associated parts must be deducted from the total weight of the unit as determined by the various State laws. In order to obtain rigidity, there has been some suggestion in the art to weld or otherwise secure the trailer frame to the tank vehicle. It has also been suggested to incorporate reinforcing members in the tank construction to constitute it a truss and thus render it a self-supporting beam In constructions of the latter named type, the reinforcing structure and the tank do not deflect together under the working load. The stresses and the resulting deflection are not of the same range nor in the same direction. This causes strains and the weaving results eventually in crystallization and fractures with ensuing leaks and failures.

One object of my invention is to provide a trailer tank of such construction that it itself constitutes a beam and may be supported directly from the tractor and ground supporting means without the aid of a chassis or trailer frame.

Another object of my invention is to provide a trailer tank construction in which the stresses are transferred to the skin of the tank proper, thus giving a greater moment of inertia around the neutral axis of the beam.

Other and further objects of my invention will appear from the following description.

In the accompanying drawings which form part of the instant specification and are to be read in conjunction therewith and in which like reference numerals are used to designate like parts in the various views;

Figure 1 is a side elevation of a trailer tank containing one embodiment of my invention.

Figure 2 is a longitudinal sectional view of the construction shown in Figure 1.

Figure 3 is a sectional view taken on the line 3—3 of Figure 2.

Figure 4 is a sectional view taken on the line 4—4 of Figure 2.

Figure 5 is a sectional view taken on the line 5—5 of Figure 2.

Figure 6 is a sectional view taken on the line 6—6 of Figure 2.

Figure 7 is an enlarged fragmentary sectional view taken on the line 7—7 of Figure 6.

Figure 8 is an enlarged fragmentary sectional view taken on the line 8—8 of Figure 4.

Figure 9 is a fragmentary view of the after part of a trailer tank showing a modified construction.

Figure 10 is a sectional view taken on the line 10—10 of Figure 9.

Referring now more particularly to the drawings, the tank body consists of a shell 1 forming a tank of any suitable cross sectional shape. The shell may be formed with a reduced forward end portion adapted to carry the fifth wheel construction by which the forward end of the tank is supported upon the tractor vehicle. The shell is provided with the usual manholes 2 and with transverse partitions 3 and 4, dividing the same into compartments. The bottom of each compartment is provided with a sump 5 communicating with a withdrawal opening 6 through which the contents of the compartments may be emptied. Welded or otherwise secured to the shell circumferentially thereof at a plurality of places along its length are transverse stiffening members. In the modification of the drawings, these are formed by members 7 and 8. Members 7, as can readily be observed from reference to Figures 2 and 6, are secured to the shell internally thereof, while members 8 are secured to the shell externally, members 7 and 8 forming together a complete peripheral reinforcement transversely of the shell. It will be obvious to those skilled in the art that the reinforcing, transverse, peripheral, skin stiffening members may be secured to the shell, either wholly externally or wholly internally without departing from the spirit of my invention. The shell 1 may be considered as a plurality of longitudinally extending stringers or longitudinal members to which the transverse stiffening members are secured. The reduced forward end portion can, of itself, be considered as a cantilever and the turning moment is transferred to the shell through the plate 9 of the reduced forward end portion. Plate 9 is provided with a pair of wings 10 which are carried aft and secured throughout their length to the shell by welding or in any other suitable manner, as can readily be seen by reference to Figures 2 and 3. The peripheral bracing of the shell is completed at the lower external portion thereof by short transverse members 11 which are welded to the skin and to the members 8 as can readily be seen by reference to Figures 2 and 6. The members 11 carry supporting members 12 shown in Figure 6 which are adapted to support pipes which may lead aft from withdrawal openings 6 so that the compartments may be emptied at a common place, as is customary in trailer vehicles. The method of securing walk ways 13 which support hose carrying compartments to the tank is shown in Figures 6 and 7. A walk way is supported by brackets 14 and provided with strengthening members 15. Brackets 14 are welded to external, transverse, skin bracing members 8. It will be apparent why I prefer to dispose the bracing members 8 externally in the lower portion of the tank. If the walk way is not desirable, the bracing members may be made of one piece and disposed internally. It will be seen by reference to Figure 6 that the internal, peripheral bracing members 7 and the external, peripheral bracing members 8 are tied together by tie plates 19 which are welded internally to members 7 and to the shell, and tie plates 20 which are welded externally to members 8 and to the shell. The shell thus braced is sufficiently strong to carry the entire load as distributed therefrom. The supporting of the shell requires that the load be borne at two points, namely at the forward and after ends.

In order to distribute the load, I provide means for transferring the stresses to the skin or shell of the tank. At the forward portion of the tank I provide a cylindrical column 16 to which is secured vertical plates 17 and 18, welded to the column 16 and the shell 1 respectively. Internally of the shell, the column 16 is provided with openings 34 adjacent the bottom of the shell to permit the space within the tube 16 to be occupied with a useful load of liquid. Externally of the bottom 9 of the reduced forward end portion, I provide reinforcing members 21 which are welded thereto.

The fifth wheel is secured to the projecting portion 22 of the tube 16 and the load is carried through the tube. It will be seen that the load is spread over an area and ultimately transferred to the shell. The major portion of the load is carried by the rear wheels since the center of gravity is toward the rear, due to the reduced forward end portion. In the form shown in Figure 2, curved plates 23 and 24 are welded to the bulkhead 4 which is in turn welded peripherally around the shell. Similarly, curved plates 25 and 26 are welded to the after bulkhead 27. Tubes 28 and 29 are welded to curved members 23 and 24, and tubes 30 and 31 are welded to curved members 25 and 26. The last mentioned tubes 28, 29, 30, and 31 project through the shell as can readily be seen by reference to Figures 1 and 4. The four tubes projecting through the shell are connected by longitudinal beams. A beam 32 connects tubes 29 and 31, and a beam 33 connects tubes 28 and 30. The beams carry the springs to which are secured the axle and ground wheels.

The modification shown in Figures 9 and 10 is an alternate method of supporting the after end of the tank. A pair of horizontal yoke plates 35 and 36 which are themselves beams are welded at respective ends to the pair of internal members 7. Four vertical yoke plates 37 are welded at their upper ends to the beams 35 and 36 and to the shell. A pair of vertical mounting fins 38 are welded to the bulkhead 4 and are laterally connected with a mounting fin stay 39. The mounting tubes 28 and 29 are welded to the mounting fins 38 and support the beams as in the previous modification. Similarly, fins 40 are welded to the after bulkhead mounting 27 and are cross connected by a fin stay 41. The mounting tubes 30 and 31 are welded to the after mounting fins 40 and support the after ends of beams 32 and 33 as before.

It will be seen that I have accomplished the objects of my invention. I have provided a tank construction of sufficient strength to constitute the tank, per se, a beam adapted to carry the load of liquid within the tank. The supporting means is secured peripherally to the shell and extends therethrough. At the forward portion, the supporting means is the tube, which has fins welded thereto. These fins are welded circumferentially, internally to the shell of the tank. At the after portion of the tank, the bulkheads are welded peripherally to the internal shell of the tank, and the supporting means, which extends through the tank, is secured to these bulkheads.

The shell itself is rendered stiff by the costal members welded peripherally to the shell of the tank at a plurality of places along its length. The reduced forward end portion has a bottom which extends into the main body of the tank. The lateral edges of this plate are welded to the shell of the tank along that portion of their length disposed within the main body of the tank, thus furnishing support for the reduced forward end portion, rendering it a cantilever.

My construction furnishes a strong tank for a comparatively small weight of material, thus enabling a large pay load to be carried by the saving of weight which has been used in the constructions of the prior art, to obtain a tank sufficiently strong to carry the load.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A trailer tank construction including in combination a tank having a shell, said tank being formed at its forward end of reduced cross-sectional area, said forward end having a bottom extending into the main body of the tank and having its lateral edges secured to the shell.

2. A trailer tank construction including in combination a tank having a shell with a forward end of reduced cross sectional area, a substantially horizontally disposed strengthening member secured to the reduced end portion, said strengthening member forming substantially an extension of the shell of the reduced end portion and extending into the main body of the tank and secured to the shell thereof.

3. A trailer tank construction including in combination a tank having a shell with a forward end of reduced cross sectional area, a strengthening member comprising substantially an extension of the lower part of the shell of the reduced end portion, said extension being secured to the shell of the main body of the tank.

4. A trailer tank construction including in combination a tank having a shell, bracing means rendering the tank of sufficient strength to constitute it a beam adapted to carry a load within the tank said shell being formed with a forward portion of reduced cross sectional area and having a bottom extending into the main body of the shell, the lateral edges of said bottom being welded to the shell, means secured to the internal periphery of the shell and extending therethrough for supporting said tank.

5. In a trailer tank, a tank shell, bracing means for said shell, a column at the forward end of said shell extending thereinto and forming a support for the forward end of the trailer tank, and webs within said tank secured to said column and said shell.

6. In a trailer tank having a shell braced to render it substantially a beam, a pair of partitions within said tank disposed at the after end thereof, said partitions being secured to the shell of said tank, two pairs of vertical members extending through said tank, each pair being secured to one of said respective partitions, the lower portions of said vertical members being supported by a pair of longitudinally extending members.

7. A trailer tank construction including in combination a monocoque tank having a shell, peripheral stiffening members secured to said shell for distributing the load within the tank to said shell, said stiffening members being substantially the sole bracing means for the tank and rendering it sufficiently rigid longitudinally to act as a beam, ground wheels, and means positioned in the tank above the ground wheels to transfer the load from the skin of the tank to said ground wheels.

8. A trailer tank construction including in combination a tank having a shell, said shell being formed with an end of reduced cross sectional area, transverse costal members welded peripherally to said shell at a plurality of longitudinally separated places therealong, said costal members serving to distribute the load over the shell to form a beam and being substantially the sole bracing means of the tank, ground wheels, means for mounting one end of said tank from the ground wheels, and means positioned in the tank above the ground wheels to transfer the load from the skin of the tank to said ground wheels.

RALPH D. GEORGE.